(12) United States Patent
Burke et al.

(10) Patent No.: US 6,427,231 B1
(45) Date of Patent: Jul. 30, 2002

(54) SYSTEM AND METHOD FOR MULTIPLE ENTRY POINT ACCESS TO AN OBJECT

(75) Inventors: Glenn S. Burke, Cambrige; Gail Zacharias, Somerville, both of MA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 08/509,753

(22) Filed: Aug. 4, 1995

Related U.S. Application Data

(63) Continuation of application No. 08/092,207, filed on Jul. 15, 1993, now abandoned.

(51) Int. Cl.[7] ............................................. G06F 9/44
(52) U.S. Cl. .................... 717/116; 717/165; 709/315
(58) Field of Search ............................. 717/116, 114, 717/140, 162, 165; 707/103 R, 104.1, 101; 709/315, 316, 332

(56) References Cited

U.S. PATENT DOCUMENTS

| | | | | |
|---|---|---|---|---|
| 4,675,810 A | * | 6/1987 | Gruner et al. | 364/200 |
| 4,868,745 A | * | 9/1989 | Patton et al. | 364/200 |
| 5,226,161 A | * | 7/1993 | Khoyi et al. | 395/650 |
| 5,261,080 A | * | 11/1993 | Khoyi et al. | 395/500 |
| 5,297,284 A | * | 3/1994 | Jones et al. | 395/700 |

FOREIGN PATENT DOCUMENTS

EP  0 546 684 A3  6/1993

OTHER PUBLICATIONS

J. F. Peters, III, "Compleat C", 1986, pp. 297–339.*
Patrick Henry Winston, "LISP", 1989, pp 175–180.*
George F. Luger, William A. Stubblefield, Artificial Intelligence and the Design of Expert Systems, pp. 515–524. The Benjamin/Cummings Publishing Company, 1989.
Dylan, An Object–Oriented Dynamic Language, Apple Computer Eastern Research and Technology, pp. 1–167, 1992.
Object–Oriented Programming in Common LISP, Sonya E. Keene A Programmer's Guide to CLOS, pp. 8, 9, 66–115, 1989.

* cited by examiner

*Primary Examiner*—Tuan Q. Dam
(74) *Attorney, Agent, or Firm*—Cesari and McKenna, LLP

(57) ABSTRACT

The invention allows a functional object in a dynamic language to be efficiently used as both a directly-invoked function and as a method in a generic function. This allows a language to combine the two concepts, simplifying the language semantics. As a preferred embodiment, a method object when created comprises as contiguous fields a header, a method-information section, a function prolog, and the method body. When called as a component of a generic function, one entry point is at the method body or at the method-information field. When called directly, another entry point exists at the function prolog field.

12 Claims, 3 Drawing Sheets

SYSTEM AND METHOD FOR MULTIPLE ENTRY POINT ACCESS TO AN OBJECT

This is a continuation of U.S. patent application Ser. No. 08/092,207, filed on Jul. 15, 1993, now abandoned.

This invention relates to a computer programming language construct, and a system and method for using such construct.

BACKGROUND OF INVENTION

Many computer languages used for program development are so-called static languages, in which most of the information about objects is discarded during compilation, so programs cannot be modified without recompilation. Dynamic languages, on the other hand, are much more flexible and allow certain actions to be taken at runtime that could not be accomplished with a static language. A popular example of a dynamic language is Common Lisp (CL). In addition, there is a strong trend toward object-oriented dynamic languages, which include Common Lisp Object System (CLOS) and Dylan as examples.

Some object-oriented languages generally provide generic function constructs. Generic functions are a class of objects used for performing actions, and correspond generally to functions and procedures of other languages. Generic functions typically contain multiple methods. Such methods typically contain a typed argument list and a code body. In Dylan, for example, a generic function contains a number of methods. When you call a generic function with certain arguments, the generic function uses the classes and identities of the arguments to determine which of the multiple methods to call. This process is called method dispatch.

When a programmer defines a method, he or she specifies the classes or identities of the arguments appropriate for the method. This is called specializing the method. The types in the argument list are called the specializers of the method. A method can only be called with arguments that match the specializers of the argument list. In the most common case, the specializer is a class, and the corresponding argument must be a general instance of the class. When the specializers of a method match a set of arguments, the method is said to be applicable to the arguments. When the generic function is called, the arguments are compared to the specializers of all the methods in the generic function. The method with the most appropriate specializers is run.

In a dynamic language, the type of an object being called is generally not known at compile time. Therefore, the code to call a functional object must be compiled in such a way as to work for all types of functions. This is typically done by having all functional objects entered in the same way, by having a single entry point at a fixed offset which is the same for all types of functional objects. When the compiler is compiling a function call, it will arrange to enter the object at that fixed offset.

CL has three types of functional objects: generic functions, ordinary functions and methods. An ordinary function cannot be added to a generic function. A method cannot be invoked outside of a generic function, except in the very restricted context of method combination, and then only using specialized syntax. Aside from these restrictions, ordinary functions and methods provide the same functionality to the user; hence, the distinction between them is an unnecessary complication of the language.

SUMMARY OF INVENTION

An object of the invention is a new language construct that simplifies the language semantics of a dynamic language.

Another object is a language construct for generic functions and methods that simplifies invocation of these objects.

In accordance with an aspect of the present invention, a novel construct for a method object is provided. By constructing the method object in accordance with the invention, it allows a functional object in a dynamic language to be efficiently used as both a directly-invoked function and as a method in a generic function. This allows a language to combine the two concepts, simplifying the language semantics.

In essence, a single method object is created that can be directly invoked as well as invoked when a generic function is called, by providing multiple entry points to the method object.

In a preferred embodiment, the method object construct of the invention comprises a header, a method-information (meth-info) field of fixed size at a fixed offset from the header and including as information the offset of the method body, a function prolog (fn-prolog) field of variable size at a fixed offset from the meth-info field, and finally the method body of variable size. The method object can have multiple entry points, at the fixed offset of the fn-prolog field, or at the offset of the method body as determined by computation.

The multiple entry points allows the passing of more information on generic function dispatch, or the avoidance of certain tasks deemed unnecessary. As one example, entering the function at a first point may involve type-checking of function arguments and certain bookkeeping activities, whereas entry to the same method at a second point may avoid or by-pass type-checking and bookkeeping tasks.

The above and further objects, details and advantages of the present invention will become apparent from the following detailed description of preferred embodiments thereof, when read in conjunction with the accompanying drawings.

DETAILED DESCRIPTION OF PREFERRED EMBODIMENT

The following conceptual framework is helpful in understanding the broad scope of the invention, and the terms defined below have the indicated meanings throughout this application, including the claims. "Data" refers herein to signals that indicate or include information. For example, data could exist as an electromagnetic or other transmitted signal or as a signal stored in electronic, magnetic, or other form.

A "data processing system" is a system that processes data. A "data processor" or "processor" is any component or system that can process data, and may include one or more central processing units or other processing components. "Memory" is any component, combination of components, or system that can store data, and may include local and remote memory and input/output devices.

A processor "accesses" data in memory by any operation that retrieves or modifies the data, such as by reading or writing a location in memory that includes the data.

A processor "operates on" data by performing an operation that includes obtaining resulting data that depends on the data operated on. For example, the resulting data could result from an operation that accesses the data operated on or from a logical or numerical operation on the data operated on.

A processor "uses" data in performing an operation when the result of the operation depends on the value of the data. Stored data can be accessed using or accessible using other data if the memory containing the stored data responds to the other data or to data that depends on the other data by permitting access to the stored data. For example, the other data may be an address, an offset used to produce an address, or a content-addressable value stored with the stored data.

An "instruction" is an item of data that a processor can use to determine its own operation. A processor "executes" a set of instructions when it uses the instructions to determine its operations.

Figure 1:
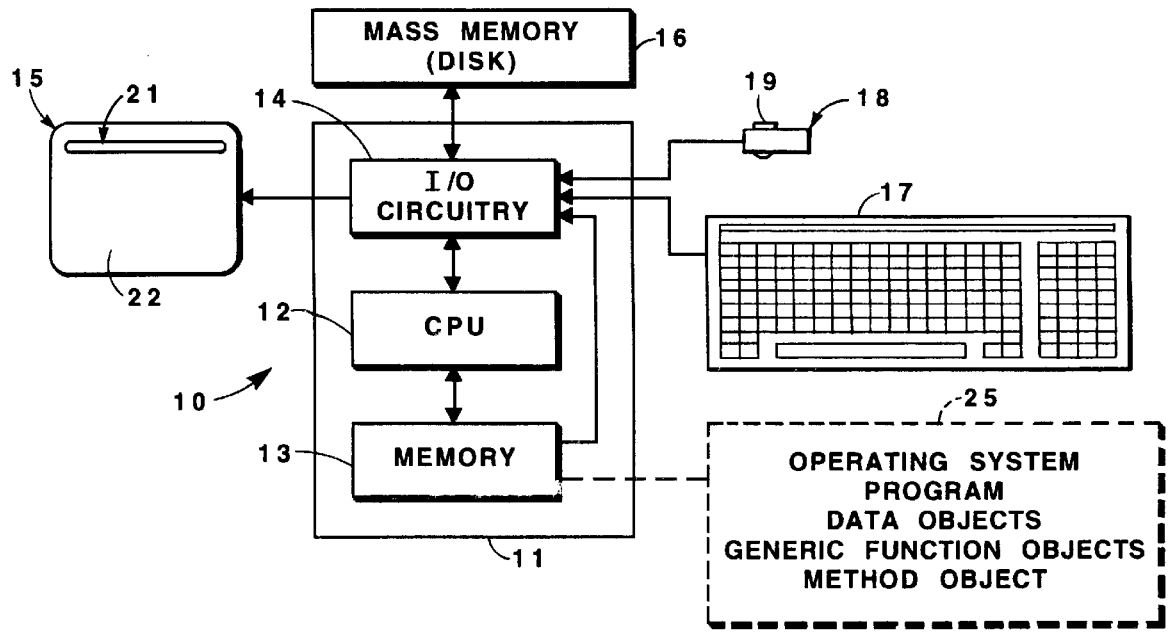
FIG. 1 is a block diagram of a typical computer system containing in memory, among other things, a method object in accordance with the invention.

FIG. 1 is a block diagram of a typical computer system for program development, comprising a workstation 10 including a console 11 containing a CPU 12, RAM memory 13, and I/O circuitry 14 for communicating with a display 15, mass memory 16, a keyboard 17, and the usual mouse 18 with button switches 19. The usual display 15 contains a title or menu bar 21 and a cursor 22.

Stored 25 in the memory 13 or 16 would be the usual operating system, the program being run, and assorted objects created by the program as would be typical of a program developed under a dynamic object-oriented language.

Some general information known to all those skilled in the art may also help the reader. Source code when run through a compiler generates object code. Compilers take the textual symbolic representation of the program in the source code and provide usually via assembly code a translated, machine-usable, output file. As is common, programs are divided up into modules and library routines or include files. An executable program is produced when the object code modules are linked with the called library routines. The executable code, among other things, keeps track of variables, constants, functions and methods by allocating memory locations, fixed or relocatable, where such objects are stored, and for convenience often identifies a particular object, such as an array element or structure field, as being located so many memory locations offset from some known starting point. This approach is used both for heap memory as well as for stacks. Thus, a routine designed to perform a function would be stored at a particular location in memory, and a jump table would be typically constructed by the operating system listing the name of the routine and its start address or entry point for accessing the routine. Thus, when the program includes a statement calling this particular routine by name, the operating system knows where to find the beginning of the sequence of instructions which when run will execute the function desired. If arguments are included in the function call, the routine is run with the arguments substituted for the formal parameters of the function. For a more detailed description, see "Inside Macintosh", published by Addison-Wesley, and "How to Write Macintosh Software" by S. Knoster, also published by Addison-Wesley.

Assume, as would be normal, that the program code in a object-oriented language created a generic function and then created under that generic function methods A, B, and C, to be respectively invoked when the generic function is called with specializers A, B, and C, respectively. When a generic function method is invoked from a called generic function, it receives a hidden extra argument which is not visible to the user. This extra argument contains information about the position of this method in the applicable method chain for this invocation of the generic function. When a function as an object separate from the generic function is invoked directly, it doesn't need and doesn't receive the hidden argument. On the other hand, when a function is invoked directly, it performs a function entry prolog (argument type-checking, etc.) which it need not perform when invoked from a generic function. Furthermore, when a function is invoked directly, the caller doesn't know whether it's invoking a method or some other kind of function. Thus, having a single general entry at a fixed offset in all functional objects allows an efficient invocation protocol.

Figure 2A:
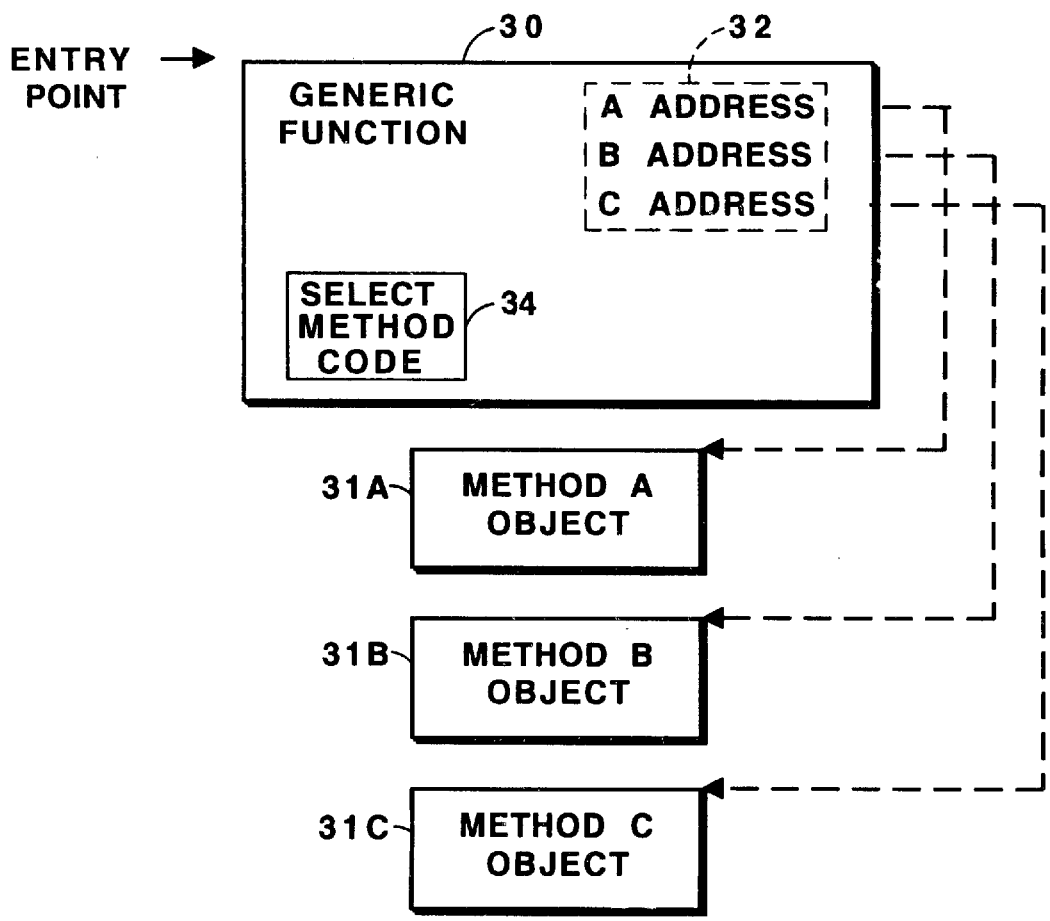
FIG. 2A shows schematically the format of a generic function when called by a program statement.
Figure 2B:
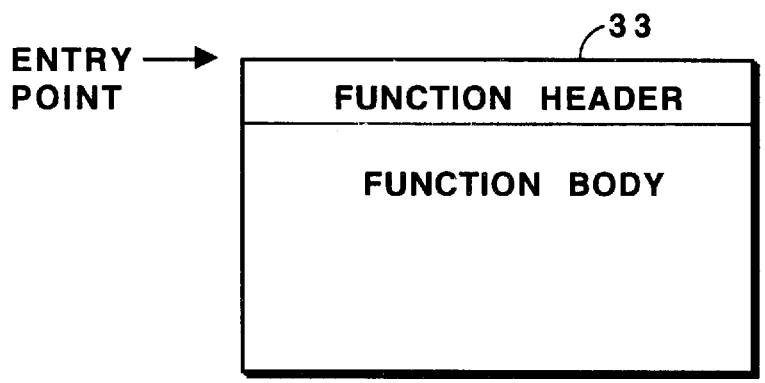
FIG. 2B shows schematically the format of an ordinary function when called by a program statement.

These differences are illustrated in FIGS. 2A and 2B of which FIG. 2A shows a typical generic function 30 with its chain of methods A, B, and C, designated 31A, 31B, 31C, respectively. The hidden extra argument 32 is, for example, a table of memory addresses for the three methods. When the generic function is called with a specializer that matches the parameter of one of the methods, B for example, method B is run by the operating system being given the memory address of the method B body. No type checking is necessary because the offset to the body 31B of method B would not be available to be run unless the specializer matched the method B parameter which means its type, in essence, had already been checked.

FIG. 2B shows function 33 being called directly. Since no generic function dispatch is involved, argument checking is highly desirable. Thus, a function conventionally performs argument checking as part of its body.

It will be observed from FIGS. 2A and 2B that two independent objects 30 and 33 exist in memory, each with its own unique entry point address. In accordance with the present invention, a new single method object is created in memory that can be called directly, or via a generic function call, and carry out or avoid carrying out the same tasks as illustrated in FIG. 2. This new object construct is illustrated at 40 in FIG. 3, and comprises four distinct but related contiguous storage regions designated as a header 41, a meth-info field 42, a fn-prolog field 43, and the method body 44. The header is the normal object header that is, however, defined by the implementation. The size of this header must be fixed, so that the following field, meth-info, occurs at a fixed offset A from the starting location of the header. Meth-info contains method specific information such as specializers and flags, as well as the offset of the method body (offset X above). The size of meth-info is fixed (any variable data are stored as fixed-size pointers to additional data structures), so that the following field, fn-prolog, occurs at a fixed offset B. Fn-prolog is variable size, so that the method body starts at different offsets in different methods.

The function prolog, fn-prolog, within the method object of the invention looks and behaves as follows:

1. Performs standard function entry actions as required by the language (e.g., check the number and types of arguments, poll for events, etc.). This may perform arbitrary computations, hence this field is of variable size.

2. Places the initial value of the hidden extra argument into a standard place as specified by the runtime architecture (e.g. in a dedicated register or on top of stack).

3. Falls into the method body.

Figure 3:
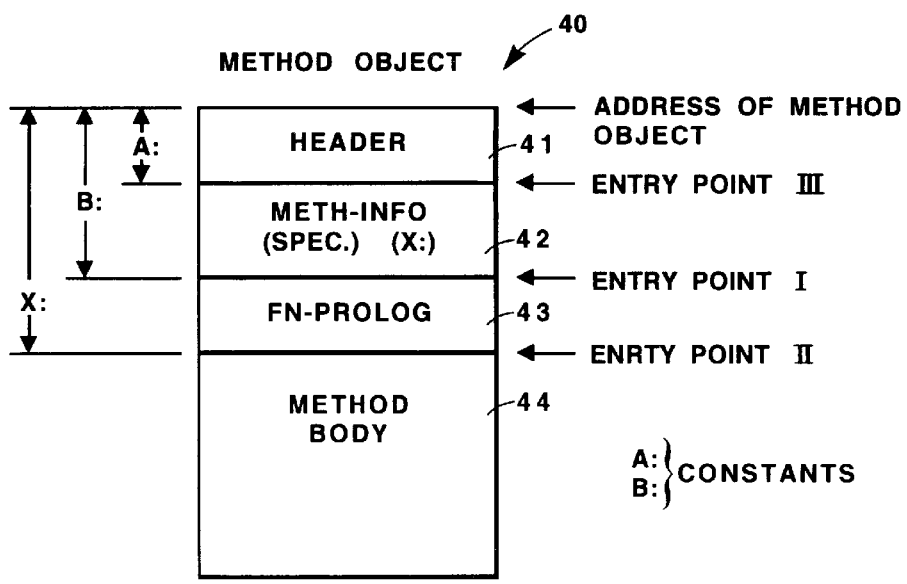
FIG. 3 is a schematic view of one form of method object in accordance with the invention.

For ordinary functional invocation, i.e., to invoke the method object of FIG. 3 directly as a function, simply jump to the fixed offset B in the method object entry point I. Sample assembly code is:

LOAD method object into REGISTER JUMP to contents (REGISTER)+B ; B is a constant The value of B is preferably the same for all method objects.

For generic function method invocation, the following steps are carried out:

1. Compute the proper value of the hidden extra argument, as specified by language semantics, given the specializer used in the call.

2. Place the hidden extra argument in a standard place as specified by the runtime architecture (e.g., in a dedicated register, or top of stack.)

3. Use the information in the meth-info field at offset A to compute the method body offset X and jump to it. This may be done in one of two ways, depending on which is faster/smaller in the target machine architecture. The value of the offset X may be fetched from meth-info 42 and added to the method address to compute the address of the method body 44. Sample assembly code is:

```
LOAD method-object into REGISTER1
LOAD contents (REGISTER1) + A into REGISTER2    ;fetch method
                                                ;body offset
                                                ;A is a
                                                ;constant
ADD REGISTER2 to REGISTER1
JUMP to contents (REGISTER1)
```

Or, as an alternative, the meth-info field may contain within it a branch to the method body, and hence the method body 44 may be reached by jumping into the meth-info field 42. Sample code for this alternative is:

```
LOAD method-object into REGISTER
JUMP to contents (REGISTER) + A    ;jump to a branch to method
                                   ;body
```

The value of offset A is preferably the same for all method objects.

Figure 4:
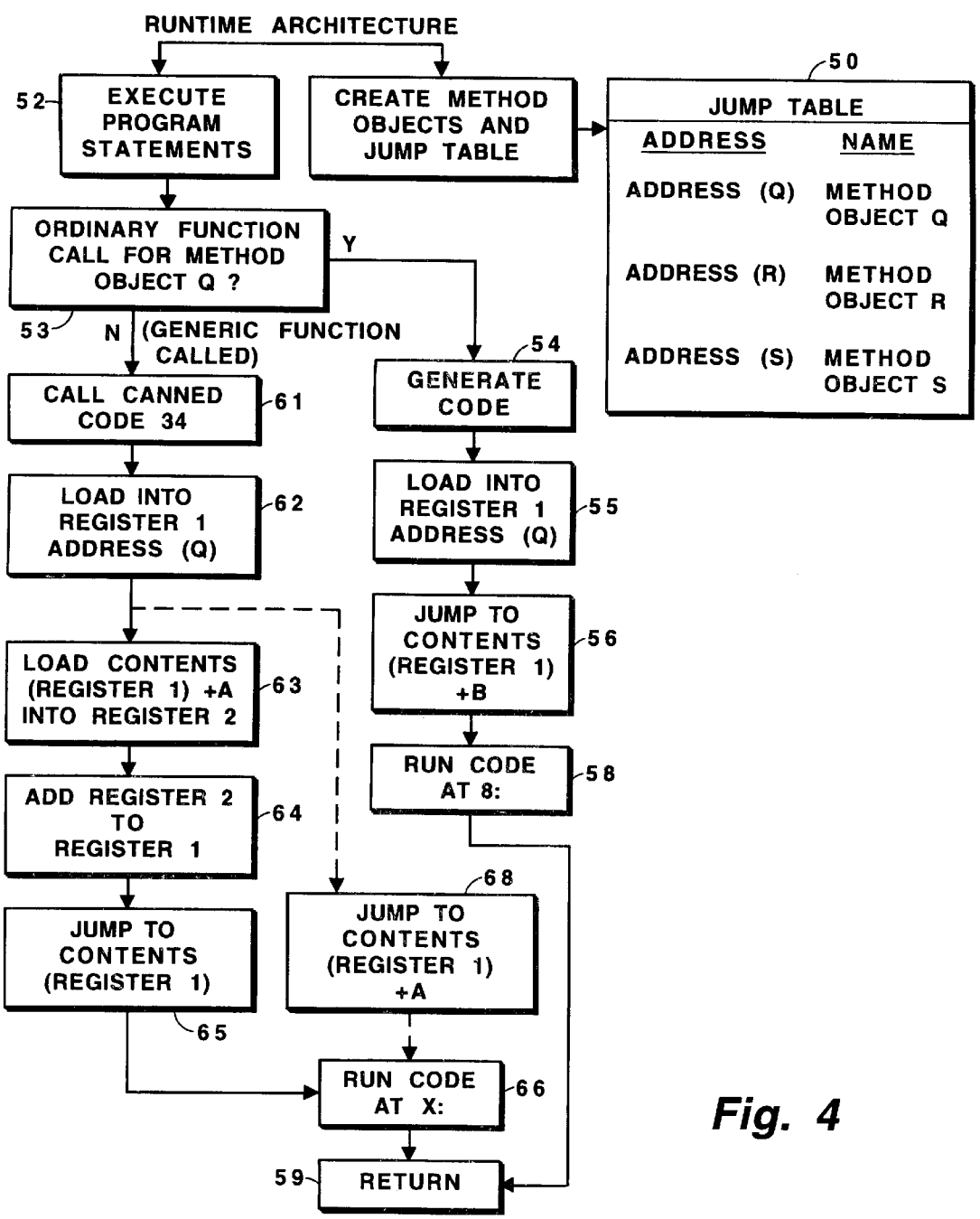
FIG. 4 is a flow chart indicating how code representing multiple entry points can be generated.

FIG. 4 illustrates the action that occurs when programming statements are executed at runtime with an ordinary function call or a generic function call using a method object in accordance with the invention. Each of method objects Q, R and S would have been created during program development and each would contain the four fields indicated in the preferred embodiment of FIG. 3. In the usual way, a jump table 50 is created with the address for each of the three method objects Q, R and S.

When encountering each program statement 52, if it is an ordinary function call of, say, method Q, then the right branch is taken and code is generated 54 that loads 55 the address of method object Q, and then jumps 56 to the B offset to entry point I (FIG. 3) to run the code 58 in the function prolog 43 and then falls through to the method body 44 and eventually returns to the caller 59.

If it is not an ordinary function call, meaning that it is a generic function call with applicable method Q, then the left branch is taken. When the operating system creates a generic function, it places some canned code (a small set of instructions to select the appropriate method and call it) inside the generic function object. See 34 in FIG. 2A. In other words, the body of a generic function is filled with canned code by the operating system, and the compiler is not involved at all. The canned code in this case would include the instructions shown in the left branch in the figure, as follows. The code loads 62 the address of method Q, then loads 63 in a second register the contents of address plus offset A, adds 64 the two registers together to get the address of entry point II, and jumps to the latter 65 (entry point II). The method body code is the run 66 followed by the usual return. This is one way of computing then offset X to the method body 44. As an alternative, shown with the dashed lines, if the method information field 42 contains a branch to the method body, then jumping 68 to the method information field 42, indicated in FIG. 3 by entry point III, will enable control following the branch to fall through to the method body 44.

As has been described, the method object illustrated in FIG. 3 can be invoked in the normal way in an object-oriented language as one component of a generic function having plural method objects with the method object selected to be run determined in the normal way by the specializers in the calling statement. So, in a simple example, a single generic function intended to apply to several argument types, such as integer, string, or vector, when called with the integer, string or vector argument will invoke the function method appropriate for that type. In this instance the entry point for the method object would be at entry point II to the method body. A typical call in Dylan would be as follows:

(double 17)

Alternatively, the method object of FIG. 3 can be used directly to, for example, perform a local calculation, or as a function that does not require class dispatch, or to build up generic functions programmatically. The format would be similar to the lambda special form of Lisp or to blocks in Smalltalk. A simple example is given below:

(add-twice 17)

In this instance, the entry point would be at entry point I in FIG. 3.

The method object of FIG. 3 can be created in a straightforward way by creating a generic function and automatically adding the desired method to it. For the example given above, the method and generic function would be defined in Dylan by:

(define-method double ((n <integer>)) (+n n))

Alternatively, the exact same method object of FIG. 3 can be created and used directly without being added to a generic function. This would be done by the following definition in Dylan:

(define add-twice (method ((n <integer>)) (+n n)))

This method can then be added directly to the generic function if desired, as follows:

(add-method add-twice double)

The invention is not limited to the above-described formats and other formats are usable. The important point is that the compiler, upon encountering either of the above formats, knows to allocate memory storage space adequate to store an instance of the method object of FIG. 3, and to preserve in, for example, a jump table a pointer corresponding to the address of the method object.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. This scope of the invention is indicated by the appended claims rather than by the foregoing description.

What is claimed is:

1. A process of using a method object stored in a memory of a computer, said method object configured for operation by a processor in accordance with a dynamic object-oriented programming language, said process comprising the steps of:

creating said method object comprising a method-information field stored at a fixed location relative to a starting memory location of said method object and a variable size method body of program code stored at another location, said method-information field containing an offset identifying the location of said method body;

executing one of an ordinary function call program statement and a generic function call program statement during run time to invoke said method body of said method object; and entering said method object at one of a first entry point to directly invoke said method body in response to execution of the ordinary function call and a second entry point to invoke said method body in the context of a generic function dispatch in response to execution of the generic function call, wherein said first entry point is different from said second entry point and other than the location of said method body, said first and second entry points enabling the processor to execute the program code contained in the method body.

2. The process of claim 1, wherein said method object further comprises a function-prolog field stored at another fixed location relative to the starting memory location of said method object, and wherein said first entry point is the another fixed location of said function-prolog field.

3. The process of claim 1, wherein said second entry point is the fixed location of said method-information field.

4. The process of claim 1 wherein said second entry point is the location of said method body.

5. For use with a dynamic object-oriented computer language used to specify code for execution by a central processing unit of a computer, a process of using a method object stored in a memory of the computer, said process comprising the steps of:

(a) creating the method object having a fixed size header, a method-information field of code stored at a fixed offset from the header, a variable size function-prolog field of code stored at a fixed offset from the header, and a variable size method body of code stored at a given offset from the header, said method-information field containing the given offset of the method body;

(b) executing one of an ordinary function call program statement and a generic function call program statement during run time to invoke said method body of said method object; and one of, (c) directly invoking the method object by entering the method object at a first entry point at the function-prolog field in response to execution of the ordinary function call and executing the code of the function-prolog field, and (d) invoking the method object in the context of a generic function dispatch by entering the method object at a second entry point at the method-information field in response to execution of the generic function call and executing the code of the method-information field.

6. The method of claim 5, wherein said directly invoking step (c) comprises the steps of:

checking types of arguments applicable to the method body;

providing a hidden extra argument to the method body in response to said checking step indicating acceptable argument types; and executing the code of the method body.

7. The method of claim 5, wherein said invoking step (d) comprises the steps of:

computing a value for a hidden extra argument in response to types of arguments to the generic function;

providing the computed hidden extra argument to the method body;

jumping to the method body in accordance with the given offset contained in the method-information field; and executing the code of the method body.

8. The method of claim 7, wherein said jumping step further comprises the step of computing the location of the method body in the memory using the given offset.

9. For use with a dynamic object-oriented computer program language used to specify code for execution by a central processing unit of a computer, apparatus for using a method object stored in a memory of a computer, said apparatus comprising:

means for creating said method object having a method-information field of code stored at a fixed location relative to a starting memory address of said method object, a variable size function-prolog field of code stored at another fixed location relative to the starting memory address, and a variable size method body field of code stored at a predetermined location relative to the starting memory address, said method-information field containing an offset identifying the predetermined location of said method body field;

means for executing one of an ordinary function call and a generic function call during run time to invoke said method body field of code; and one of, means for directly invoking said method object by entering the method object at a first entry point at the function-prolog field in response to execution of the ordinary function call and means for executing the code of the function-prolog field; and means for invoking said method object in the context of a generic function dispatch by entering the method object at a second entry point at said method-information field in response to execution of the generic function call and means for executing the code of the method-information field, wherein said first and second entry points enable the central processing unit to execute the code contained in the method body.

10. An arrangement for using a method object in accordance with a dynamic object-oriented programming language of a computer, said arrangement comprising:

a memory for storing the method object, the method object comprising:

a header field having a starting memory address;

a method-information field located at a first offset from the starting memory address, said method-information field containing a predetermined address value;

a function-prolog field of code located at a second offset from the starting memory address; and a method body field located at said predetermined address value from the starting memory address, said method body field containing program code for execution by said computer, and a processor for invoking said method object in response to entering said method object at one of a first entry point and a second entry point, wherein said first entry point is different from said second entry point.

11. The method object of claim 10 wherein said first entry point is said method-information field and wherein the processor computes the location of said method body field using said predetermined address value.

12. The method object of claim 10 wherein said second entry point is said function-prolog field and wherein the processor executes the code of the function-prolog field to provide a hidden extra argument to said method body.

* * * * *

UNITED STATES PATENT AND TRADEMARK OFFICE
CERTIFICATE OF CORRECTION

PATENT NO. : 6,427,231 B1
DATED : July 30, 2002
INVENTOR(S) : Burke et al.

It is certified that error appears in the above-identified patent and that said Letters Patent is hereby corrected as shown below:

<u>Title page,</u>
Item [*] Notice, delete "0" and insert -- 5 --.

Signed and Sealed this

Thirtieth Day of August, 2005

JON W. DUDAS
*Director of the United States Patent and Trademark Office*